(12) United States Patent
Jurkat et al.

(10) Patent No.: US 7,649,282 B2
(45) Date of Patent: Jan. 19, 2010

(54) WIND PARK AND METHOD FOR THE OPERATION OF A WIND PARK

(75) Inventors: Mark Jurkat, Norderstedt (DE); Robert Hester, Hamburg (DE)

(73) Assignee: Nordex Energy GmbH, Norderstedt (DE)

( * ) Notice: Subject to any disclaimer, the term of this patent is extended or adjusted under 35 U.S.C. 154(b) by 0 days.

(21) Appl. No.: 11/775,968

(22) Filed: Jul. 11, 2007

(65) Prior Publication Data

US 2008/0048501 A1 Feb. 28, 2008

(30) Foreign Application Priority Data

Jul. 13, 2006 (DE) ........................ 10 2006 032 389

(51) Int. Cl.
*H02J 1/00* (2006.01)
*H02J 3/00* (2006.01)

(52) U.S. Cl. .............................. 307/84; 307/80; 307/85

(58) Field of Classification Search .................. 307/81, 307/84, 85, 80; 290/44, 55
See application file for complete search history.

(56) References Cited

U.S. PATENT DOCUMENTS

2002/0029097 A1* 3/2002 Pionzio et al. .............. 700/286

FOREIGN PATENT DOCUMENTS

| DE | 10 2004 060 943 A | 7/2006 |
|----|-------------------|--------|
| EP | 1 571 746 A1 | 3/2004 |
| EP | 1 467 463 A1 | 10/2004 |
| GB | 2 330 256 A | 4/1999 |
| WO | 01/25630 A1 | 4/2001 |
| WO | 03/030329 A1 | 4/2003 |

* cited by examiner

*Primary Examiner*—Albert W Paladini
*Assistant Examiner*—Carlos Amaya
(74) *Attorney, Agent, or Firm*—Vidas, Arrett & Steinkraus, P.A.

(57) ABSTRACT

A wind park with a plurality of wind energy plants, which each have one plant control, which presets a desired value for the active power to its wind energy plant, and with a park control, which presets a desired value for the active power to be generated for each plant control and limits the active power fed by the wind park to a preset value, by shutting down a first group of wind energy plants and presetting a desired value for the active power to a second group of wind energy plants at a time, characterised in that the park control starts the wind energy plants of the first group again when the sum of the actual values of the active power of the wind energy plants of the second group has reached the preset desired value and/or a predetermined time duration has elapsed.

19 Claims, 1 Drawing Sheet

WIND PARK AND METHOD FOR THE OPERATION OF A WIND PARK

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a wind park and to a method for the operation of a wind park. The wind park has a plurality of wind energy plants, which each have one plant control. The plant control is able to preset the active power to be generated by the wind energy plant, provided that there is enough wind. For this purpose, a desired value is preset to the plant control of the wind energy plant. The plant control can be also realised as a closed-loop control, so that the actual value of the active power generated by the wind energy plant can be regulated to the desired value. Further, the wind park is equipped with a park control, which presets a desired value for the active power to each plant control.

From WO 01/25630 A1, the entire contents of which is incorporated herein by reference, a wind park is known, the power rating of which is greater than the power which can be fed and/or is permitted to be fed into the power supply grid to which the wind park is connected. In order to limit the power which is fed to the maximum value, it is proposed to limit the fed power of all the wind energy plants of the wind park.

From WO 03/030329 A1, the entire contents of which is incorporated herein by reference, a wind park is known, the active power delivered into the power supply grid of which can be preset by a grid operator. The control of the wind park reduces the output for the wind energy plants according to the defaults, wherein the output thereof can be throttled equally or differently at a time.

From GB 2 330 256 A, the entire contents of which is incorporated herein by reference, a wind energy plant is known, in which the voltage is measured at the connection point of the wind energy plant to the grid and the maximum possible power to be fed is calculated. An overvoltage through the power which is fed into the grid by the wind energy plant is to be avoided at relatively weak grid connections in particular.

From EP 1 467 463 A1, the entire contents of which is incorporated herein by reference, a wind park is known, which has a park control. The active power fed into the grid by the wind park is adjusted depending on the frequency measured at the grid connection point. This control/closed loop control for the wind park is based on the fact that when more power is generated than consumed in a grid, the frequency increases, and the frequency then decreases when more power is consumed than is generated.

From EP 1 571 746 A1, the entire contents of which is incorporated herein by reference, a method for the closed-loop control of the active power in a wind park is known. The method provides that a desired value for the active power of the park control can be preset manually or dynamically. In the case in which the actual value of the power exceeds the desired value, two methods are provided in order to reduce the surplus power of the wind park. In the first concept, the power is run up to a maximum value for selected wind energy plants, and the remaining other plants are scaled down. In an alternative concept, one or several wind energy plants are scaled down and the fine adjustment of the power is performed by the remaining plants.

It is known that under certain grid conditions and/or when certain grid errors occur, it may happen that the power fed into the grid by a wind park has to be limited within a short period of time and has to be stably maintained on the limited value. Usually the signal which triggers this process in the wind park is preset by the grid operator. The period of time within which the active power has to be scaled down is less than 4 seconds, for instance.

The present invention is based on the objective to provide a wind park and a method for the operation thereof, which permits with simple means to limit the active power fed into electric grid within a short period of time, without limiting the possibilities for the closed loop control of the wind park.

BRIEF SUMMARY OF THE INVENTION

The wind park according to the present invention has a plurality of wind energy plants, which each have one plant control. The plant control presets the value of the active power to be generated for the assigned wind energy plant. The park control presets a desired value for the overall active power to be fed into the grid. According to the present invention, the park control limits the active power fed by the wind park into the electric power supply grid to a preset value. The magnitude of the preset value as well as the time duration can be determined either by the park control itself or it may be preset to the park control from the electric utility. It is also possible that the time duration for the preset value is not determined in advance but that it results from later signals to the park control. In order to achieve a rapid limitation of the active power fed, the park control subdivides the wind energy plants of the wind park into a first and a second group. The wind energy plants of the first group are shut down. A desired value for the active power thereof is preset to each of the wind energy plants of the second group. By the park control, it is taken advantage of the fact that shutting down the wind energy plants, a fast shutdown or an emergency stop for instance, works significantly faster than the adjustment of the wind energy plants to a lower desired value. According to the present invention, it is provided that the park control starts the wind energy plants of the first group again as soon as the sum of the actual values of the active power of the wind energy plants of the second group has reached the preset desired value. Preferably, the park control begins to run up and/or to couple in the wind energy plants again, when a stationary value for the actual value has been reached, which roughly corresponds to the desired value. Alternatively or in addition, running up again and/or coupling in again can be initiated after a predetermined time duration. This procedural step achieves that after a rapid reduction of the active power through the shut-off of the wind energy plants of the first group, the same are started and connected to the grid again.

Through speedy running up and/or switching in again the wind energy plants of the first group, it is made sure that the power output of the whole wind park can be quickly regulated again in its full extent, i.e. with all the wind energy plants, even after a power limitation.

Furthermore, the desired value of the active power of each individual wind energy plant is reduced, through which the distance to the maximum possible active power influenced by the wind velocity increases. This guarantees a longer constant production of active power even at decreasing wind velocity, which augments the output on the one hand and contributes to the grid stability through the constant production of active power on the other hand.

In a preferred embodiment, the park control is realised such that the second group, i.e. that group of wind energy plants which is operated further, is selected such that the actual value of the overall active power fed by the second group is smaller or equal to the preset value for the active power. Through the selection of the second group, it is made sure that the preset power value to which it is desired to be reduced is not or only slightly exceeded. Further, the park control in the preferred embodiment makes sure that the number of the wind energy plants in the first group is as small as possible. Thus, in the method according to the invention, it is made sure that only as many plants are shut down as necessary. Through this, it is achieved that the actual value of the power fed is not unnecessarily small after individual wind energy plants had been shut down, but deviates whenever possible only slightly from the preset value for the power which is fed.

In a further embodiment, the park control selects the wind energy plants of the second group such that the sum of the actual values of the active power of these wind energy plants roughly corresponds to the preset value of the active power. Through this, it is made sure that only a small control intervention has to take place in the wind energy plants of the second group. Through this, it can be also made sure the wind energy plants are operated further at unfavourable grid conditions and thus, the active power can be fed for supporting the grid at least for the preset period of time.

In a preferred embodiment, the plant controls of the individual wind energy plants are connected to the park control via a bidirectional data line. Via the data line, data regarding the condition of the wind energy plant can be forwarded to the park control, for instance. These data, which are related to the real actual value of the generated active power, for instance, but also to other aspects, can be taken into account when arranging the classification into the first and/or the second group.

In a preferred embodiment, the park control receives commands regarding the desired value of the power to be fed. This means that the grid operator has the opportunity to preset the power to be fed and the time duration for the wind park via a central control of the grid operator.

In a practical embodiment, the park control is realised as a closed-loop control, which is provided with a measurement equipment. The measurement equipment measures the active power fed into the grid, so that the park control can regulate the actual value correspondingly.

In a preferred embodiment, the park control presets the same desired value for the active power to each one of the wind energy plants of the second group. For instance, in this embodiment the wind energy plants of the second group can then be selected such that they are already close to the preset value for the power.

The objective according to the present invention is also resolved by a method for the control of a wind park. The wind park has a plurality of wind energy plants, the plant controls of which preset a desired value for the active power of each wind energy plant at a time. For a preset period of time, the park control according to the present invention limits the active power fed by the wind park to a preset value. For this purpose, the park control shuts down a first group of wind energy plants and presets a desired value for the active power to a second group of wind energy plants at a time. Therefore, the method according to the present invention permits to limit the power fed by the wind park very rapidly, because cutting off the wind energy plant, by a rapid stop for instance, takes significantly less time than scaling down the active power. According to the present invention, it is provided that the park control starts the wind energy plants of the first group again as soon as the sum of the actual values of the active power of the wind energy plants of the second group has reached the preset desired value. Preferably, the park control begins to run up and/or to couple in the wind energy plants again when a stationary value for the actual value has been reached which roughly corresponds to the desired value. This procedural step has the effect that after a rapid reduction of the active power through the cut-off of the wind energy plants of the first group, the same are started and connected to the grid again.

In the method according to the present invention, the park control selects the second group of wind energy plants such that the actual value of the overall active power fed by the second group is smaller than the preset value for the active power and the number of the wind energy plants in the first group is as small as possible. The method according to the present invention makes sure that only as much wind energy plants are cut off as is necessary. At the same time, in the method according to the present invention, the park control selects the wind energy plants of the second group, i.e. the wind energy plants which are operated further, such that the overall power value generated by these wind energy plants is smaller or equal to the preset value for the power output. Thus, the power output value provided by the wind energy plant is as near as possible to the preset value.

In an also preferred embodiment, the park control selects the wind energy plants of the second group such that the actual value of the power output of these wind energy plants roughly corresponds to the preset value of the power output. By this procedural step, the park control observes different combinations of wind energy plants and compares the overall power output provided by these wind energy plants with the preset power value.

In a preferred extension of the method according to the present invention, the plant controls of the individual wind energy plants notify their mode of operation and/or the actual value of the power fed to the park control.

In a preferred embodiment, the park control receives a command regarding the limitation of the power which is fed. For instance, this command can be given be an electric utility.

In a preferred embodiment, the park control is provided with a measuring equipment in order to measure the actual value of the active power fed.

The park control regulates the actual value of the active power to the preset power value. The realisation of the park control as a closed-loop control permits to maintain the preset power more exactly.

In a preferred embodiment, the park control presets the same desired value to each one of the wind energy plants of the second group. In an also preferred embodiment, the park control limits the preset value for the active power for a preset time duration at a time. Subsequently, the wind park returns into its not reduced operation, in which is then fed the maximum active power, for instance.

In a preferred extension of the invention, after coupling in the wind energy plants of the first group, the sum of the active powers of the wind energy plants of the first group is increased, and the sum of the active power of the wind energy plants still remaining on the grid is reduced, such that the sum of the active powers of both groups does not or only marginally exceed the preset value. Through this extension of the method according to the present invention, it is made sure that the first group is connected again after a rapid active power limitation, in order to have a number of actuators as great as possible for further limitation at hand.

BRIEF DESCRIPTION OF THE DRAWING

The single FIGURE shows a schematic view of a wind park with individual wind energy plants 10, 12, 14. In the FIGURE, three wind energy plants are drawn in an exemplary manner. Each one of the wind energy plants 10, 12, 14 has a plant control, via which the electric power generated by the wind energy plant is adjusted. Depending on the construction of the wind energy plant, different components can serve for this purpose, like pitch angle of the rotor blades, driving of the generator and of the converter and the like, for example.

DETAILED DESCRIPTION OF THE INVENTION

Figure 1:
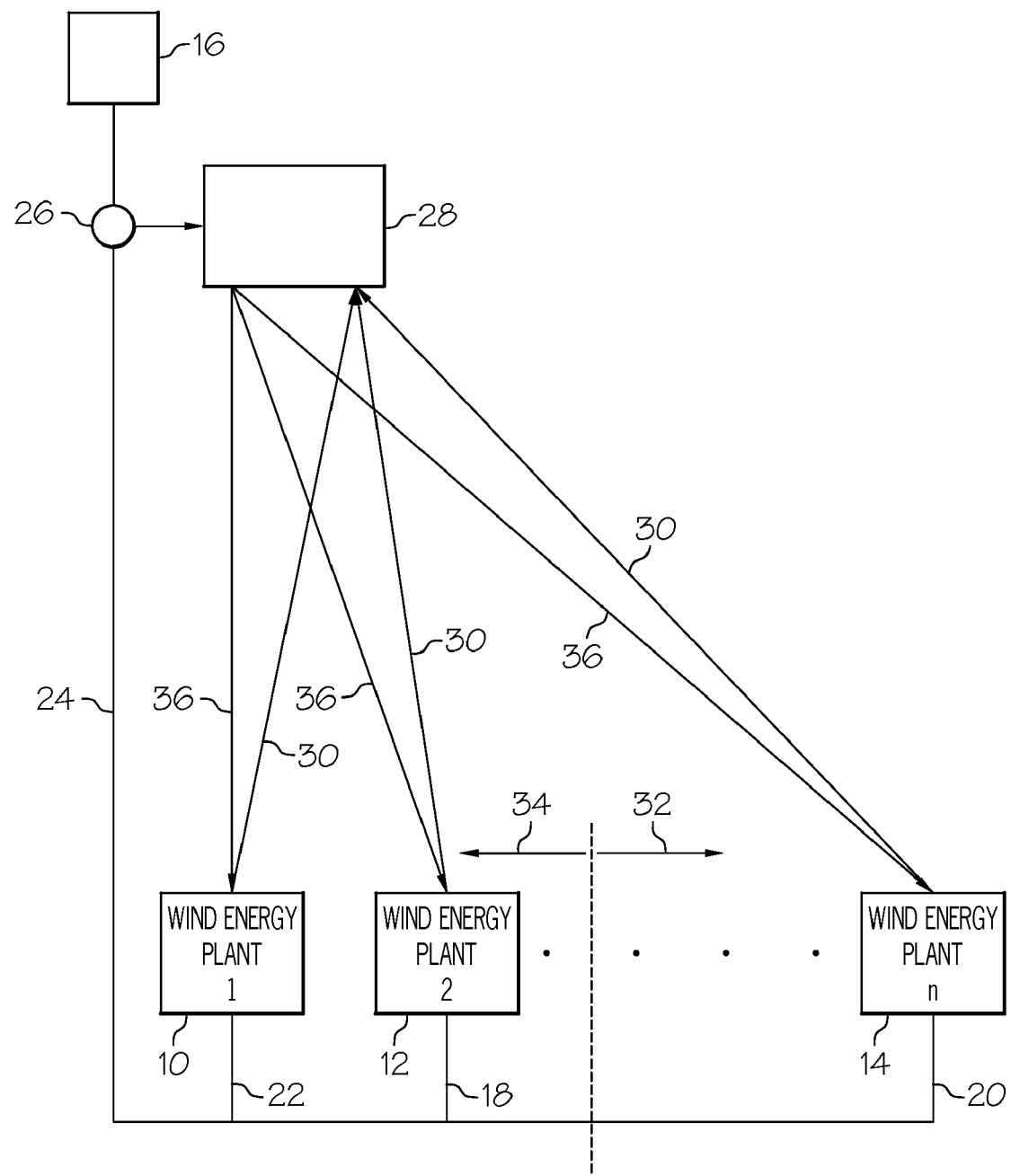

While this invention may be embodied in many different forms, there are described in detail herein a specific preferred embodiment of the invention. This description is an exemplification of the principles of the invention and is not intended to limit the invention to the particular embodiment illustrated The power generated by the individual wind energy plants 10, 12, 14 is combined in the wind park and is fed into the electric grid 16. In the depicted FIGURE, the wind energy plants are connected via stub lines 18, 20, 22 to a main line 24, which runs out into a grid connection point 26. However, it is irrelevant for the invention whether one main line 24 or several lines run out into the grid connection point 26.

A park control realised as a wind park closed-loop controller 28 is provided for the wind park. The wind park closed-loop controller 28 receives measurement values from the grid connection point 26, from which the actual value of the active power fed into the grid 16 is determined.

In response to an external control signal of the electric utility (EVU), the wind park closed-loop controller 28 drives the individual wind energy plants via data lines 36. The wind park closed-loop controller 28 forwards corresponding control signals to the wind energy plants 10, 12, 14 via the data lines 36. In the depicted example, a group 32 of wind energy plants, i.e. the wind energy plants in the FIGURE at the right side of the separation line drawn in dots, is shut off via a rapid stop signal. In a rapid stop of the group 32, the delivery of active power by the wind energy plants is interrupted within a few seconds.

The wind park closed-loop controller 28 presets a desired value for the active power to be fed for the remaining wind energy plants 34, which also comprise the wind energy plants 10 and 12. The selection of the groups 32, 34 of wind energy plants is performed by the wind park closed-loop controller according to the criterion that the actual value of the active power of the wind energy plants continued in operation is as much as possible only slightly smaller or equal to the maximum value for the active power to be fed into the grid 16, which is preset by the wind park closed-loop controller. In order to be able to select the groups 32, 34 of the wind energy plants, the wind energy plants 10, 12 and 14 indicate their mode of operation to the wind park closed-loop controller 28 via data lines 30.

Even though the wind energy plants 10, 12 which were continued in operation, are nearer to the grid connection 26 than the group 32 of the cut-off wind energy plants in the depicted example of realisation, there are very different possibilities for the selection of the wind energy plants. For instance, the same can also be selected according to their position in the wind park, wherein the wind energy plants with the less power-effective positions are cut off. An additional concept is to select the wind energy plants which are to be continued in operation such that it is dealt with wind energy plants having a roughly equal actual value of the active power.

It is also possible to take in account already in the selection of the wind energy plants to be cut off, that the same are desired to be run up again after reaching a steady state.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A wind park with a plurality of wind energy plants (10, 12, 14), which each have one plant control, which presets a desired value for the active power to its wind energy plant, and with a park control (28), which presets a desired value for the active power to be generated for each plant control and therefore limits the active power fed by the wind park to the grid to a preset value, by shutting down a first group (32) of wind energy plants (14) and at the same time presetting a desired value for the active power to a second group (34) of wind energy plants (10, 12), characterised in that the park control re-starts the wind energy plants of the first group again once the sum of the actual values of the active power of the wind energy plants of the second group has reached the preset desired value of the active power to be fed to the grid.

2. A wind park according to claim 1, characterised in that the park control (28) selects the second group such that the actual value of the overall active power fed by the second group is smaller or equal to the preset value for the active power and the number of the wind energy plants in the first group is selected as small as possible.

3. A wind park according to claim 1, characterised in that the park control selects the wind energy plants of the second group such that the sum of the actual values of the active power of these wind energy plants roughly corresponds to the preset value of the active power.

4. A wind park according to claim 1, characterised in that the plant control of each wind energy plant is interconnected with the park control via a data line.

5. A wind park according to claim 1, characterised in that the park control receives commands regarding the desired value of the power to be fed into the grid.

6. A wind park according to claim 1, characterised in that the park control has a measuring equipment which measures the active power fed into the grid.

7. A wind park according to claim 6, characterised in that the park control regulates the value of the active power fed into the grid.

8. A wind park according to claim 1, characterised in that the park control presets the same desired value for the active power to each one of the wind energy plants of the second group.

9. A wind park according to claim 1, characterised in that the park control presets a desired value for the active power different from the remaining desired values for at least one of the wind energy plants of the second group.

10. A method for the control of the wind park, which has a plurality of wind energy plants, the plant control of which presets a desired value for the active power of each wind energy plant at a time, wherein a park control is provided which limits the active power fed by the wind park to a preset value by shutting down a first group of wind energy plants and presetting a desired value for the active power to a second group of wind energy plants at the time, characterised in that the park control starts the wind energy plants of the first group again when the sum of the actual values of the active power of the wind energy plants of the second group has reached the preset desired value.

11. A method according to claim 10, characterised in that the park control selects the second group such that the actual value of the overall active power fed by the second group is smaller or equal to the preset value for the active power, and the number of the wind energy plants in the first group is selected as small as possible.

12. A method according to claim 10, characterised in that the park control selects the wind energy plants of the second group such that the sum of the actual values of the active power of these wind energy plants roughly corresponds to the preset value of the active power.

13. A method according to claim 10, characterised in that the plant controls of the individual wind energy plants notify their mode of operation and/or their actual value for the active power fed to the park control.

14. A method according to claim 10, characterised in that the park control receives commands regarding the limitation of the power which is fed.

15. A method according to claim 10, characterised in that the park control has a measuring equipment which measures the real value of the active power which is fed, wherein the park control regulates the actual value of the active power to the preset power value.

16. A method according to claim 15, characterised in that the park control presets the same desired value to each one of the wind energy plants of the second group.

17. A method according to claim 15, characterised in that the park control presets a desired value different from the remaining desired values for the active power for at least one of the wind energy plants of the second group.

18. A method according to claim 10, characterised in that after coupling in again the wind energy plants of the first group, the sum of the active powers of the wind energy plants of the first group is increased and the sum of the active power of the wind energy plants of the second group is reduced, such that the sum of the active power of both groups does not or only marginally exceed the preset value.

19. A method according to claim 10, characterised in that the park control limits the preset value for the active power until the park control receives a signal to cancel the limitation.

\* \* \* \* \*